(12) United States Patent
Pazhyannur et al.

(10) Patent No.: US 10,219,178 B2
(45) Date of Patent: Feb. 26, 2019

(54) CHANNEL AGGREGATION USING WI-FI

(71) Applicant: Cisco Technology, Inc., San Jose, CA (US)

(72) Inventors: Rajesh Pazhyannur, Fremont, CA (US); Vivek Jha, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 167 days.

(21) Appl. No.: 14/844,633

(22) Filed: Sep. 3, 2015

(65) Prior Publication Data

US 2016/0156548 A1 Jun. 2, 2016

(30) Foreign Application Priority Data

Dec. 2, 2014 (IN) .......................... 1264/KOL/2014

(51) Int. Cl.
*H04W 28/08* (2009.01)
*H04W 80/02* (2009.01)
*H04W 28/02* (2009.01)
*H04L 12/709* (2013.01)
*H04L 12/801* (2013.01)
*H04W 88/06* (2009.01)
*H04L 12/835* (2013.01)
*H04W 72/08* (2009.01)

(52) U.S. Cl.
CPC .......... *H04W 28/08* (2013.01); *H04L 45/245* (2013.01); *H04L 47/34* (2013.01); *H04W 28/0231* (2013.01); *H04W 80/02* (2013.01); *H04L 47/30* (2013.01); *H04W 28/0268* (2013.01); *H04W 72/087* (2013.01); *H04W 88/06* (2013.01)

(58) Field of Classification Search
CPC .................................................... H04W 28/08
See application file for complete search history.

(56) References Cited

U.S. PATENT DOCUMENTS

| 8,971,906 B2 | 3/2015 | Jose et al. |
| 9,014,091 B2 | 4/2015 | Sajadieh |
| 9,055,576 B2 | 6/2015 | Chen et al. |
| 2011/0317642 A1* | 12/2011 | Eravelli ................ H04L 1/1887 370/329 |
| 2012/0140633 A1* | 6/2012 | Stanwood ........... H04L 47/2458 370/235 |

(Continued)

OTHER PUBLICATIONS

"Understanding 3GPP Release 12: Standards for HSPA+ and LTE Enhancements", 4G Americas, 3GPP Release 12 Executive Summary, Feb. 2015, 13 pages.

(Continued)

*Primary Examiner* — Jason E Mattis
(74) *Attorney, Agent, or Firm* — Edell, Shapiro & Finann, LLC

(57) ABSTRACT

Data to be transmitted to a user device may be received at a network device. It may be determined that the user device has network connectivity to the network device via a wide area wireless network connection and that the user device also separately has connectivity to the network device via a local area wireless network connection to an access point. The data may be split so that some portion of the data is to be transmitted by the wide area wireless network connection and another portion of the data is to be transmitted by the local area wireless network connection.

18 Claims, 11 Drawing Sheets

(56) References Cited

U.S. PATENT DOCUMENTS

| | | | |
|---|---|---|---|
| 2014/0056278 A1* | 2/2014 | Marinier | H04W 72/044 370/330 |
| 2014/0307622 A1* | 10/2014 | Horn | H04L 45/245 370/328 |
| 2014/0369201 A1 | 12/2014 | Gupta et al. | |
| 2015/0163848 A1 | 6/2015 | Lin et al. | |
| 2015/0181638 A1 | 6/2015 | Tabet et al. | |
| 2015/0264726 A1* | 9/2015 | Zhu | H04W 84/12 370/329 |
| 2015/0350952 A1* | 12/2015 | Ozturk | H04W 28/085 370/329 |
| 2016/0088542 A1* | 3/2016 | Belghoul | H04W 28/0268 370/331 |
| 2016/0119939 A1* | 4/2016 | Himayat | H04W 28/0278 370/329 |
| 2016/0219475 A1* | 7/2016 | Kim | H04W 76/025 |
| 2017/0272217 A1* | 9/2017 | Li | H04W 28/08 |

OTHER PUBLICATIONS

"LTE in unlicensed spectrum", Jun. 19, 2014, Sophia Antipolis, France, http://www.3gpp.org/news-events/3gpp-news/1603-lte_in_unlicensed, 6 pages.

"LTE Small Cell Enhancement by Dual Connectivity", white Paper, Wireless World Research Forum, Outlook Visions and research directions for the Wireless World, Nov. 2014, No. 15, Version 1.1, 22 pages.

"CableLabs Perspectives on LTE-U Coexistence with Wi-Fi and Operational Modes for LTE-U", CableLabs, Rogers, Benu Networks, Ruckus Wireless, RAN64, Sophia Antipolis, France, 2014, 15 pages.

"Requirements and Coexistence Topics for LTE-U", 3GPP LTE-U Workshop, Sophia Antipolis, France, Jun. 13, 2014, RSW-140010, Sony Mobile Communications, 11 pages.

\* cited by examiner

CHANNEL AGGREGATION USING WI-FI

PRIORITY CLAIM

This application claims priority to Indian Provisional Patent Application No. 1264/KOL/2014, filed Dec. 2, 2014, the entirety of which is incorporated herein by reference.

TECHNICAL FIELD

The present disclosure relates to wireless communications systems and technologies.

BACKGROUND

Wireless technology has evolved rapidly in recent years. The Long Term Evolution (LTE) (also referred to as $4^{th}$ Generation (4G) LTE) standard developed by the 3GPP (3rd Generation Partnership Project) now has been extended with a proposal for the use of the LTE radio communications technology in unlicensed spectrum, such as the 5 GHz band used by dual-band Wi-Fi® equipment. Wi-Fi as used herein refers to any "wireless local area network" (WLAN) product based on IEEE 802.11 standards.

The term License Assisted Access (LAA) has been used to describe this development and a workshop has been established to share ideas in LAA-LTE. The study, however, mainly focused on co-existence between LTE and Wi-Fi. For example, some 3GPP and 4G vendors proposed time-division multiplexing between LTE and Wi-Fi to share the same unlicensed spectrum. This is not a good solution that takes advantage of technical capabilities of either LTE or Wi-Fi.

DESCRIPTION OF EXAMPLE EMBODIMENTS

Overview

Presented herein are architectures for channel aggregation at the Packet Data Convergence Protocol (PDCP) or Media Access Control (MAC) layer of a wireless network stack. The associated methods and architectures are useful for LAA-WiFi. In one embodiment, a method is provided to split communication data between a wide area wireless network connection and a local area wireless network connection. Data to be transmitted to a user device may be received at a network device. It may be determined that the user device has network connectivity to the network device via a wide area wireless network connection and that the user device also separately has connectivity to the network device via a local area wireless network connection to an access point. The data may be split so that some portion of the data is to be transmitted by the wide area wireless network connection and another portion of the data is to be transmitted by the local area wireless network connection.

Detailed Description

LTE and Wi-Fi aggregation, which also may be referred to as channel aggregation, is provided by using a Wi-Fi Convergence Protocol implemented at the Packet Data Convergence Protocol (PDCP) layer or Media Access Control (MAC) layer. The Wi-Fi Convergence Protocol may also be referred to as a Wi-Fi Aggregation Protocol. The PDCP layer is one of the layers of a radio traffic stack in a Universal Mobile Telecommunications System (UMTS) and performs Internet Protocol (IP) header compression and decompression, transfer of user data and maintenance of sequence numbers for Radio Bearers which are configured for serving radio network subsystem (SRNS). Aggregating at the PDCP layer may avoid complications at the MAC layer and keeps traffic aggregation close to the IP layer. This also takes advantage of the PDCP ciphering capability and minimizes changes to the core network. Aggregating at the MAC layer, however, can be achieved in a manner very similar to existing LTE Channel Aggregation (CA), in which the PDCP layer and Radio Link Control (RLC) layer are unaware of Wi-Fi and the MAC layer can make radio dependent decisions on traffic splitting between Wi-Fi and LTE.

In various embodiments, a first one of LTE services and Wi-Fi services may be used to establish a primary channel to communicate with a user equipment (UE) and a second one of LTE services and Wi-Fi services may be used to establish a secondary channel for the communication. A Wi-Fi aggregation function may be implemented that determines how to distribute traffic between Wi-Fi and LTE. Further, a dual Ethernet interface access point (AP) may be provided that simplifies implementing the channel aggregation in a physical device, without significantly modifying hardware of either a Wi-Fi AP or an LTE-AP.

PDCP Aggregation

Figure 1:
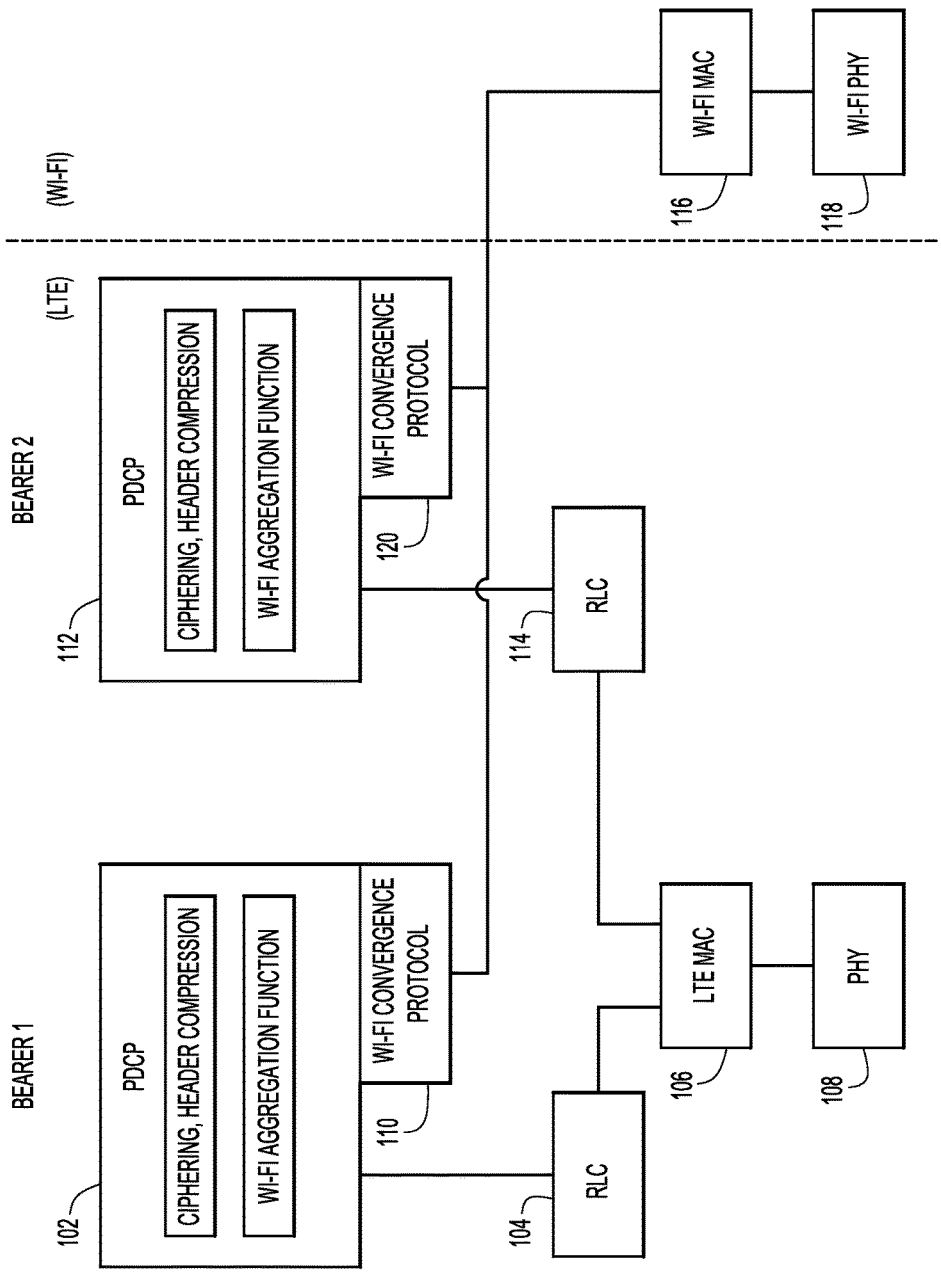
FIG. 1 is a block diagram illustrating LTE and Wi-Fi aggregation at the Packet Data Convergence Protocol (PDCP) layer according to a first embodiment.

Referring first to FIG. 1, an aggregation architecture is shown with a bearer 1 and a bearer 2, according to one embodiment. Bearer 1 may have a LTE stack providing LTE services. Bearer 2 may have a LTE stack providing LTE services and a Wi-Fi stack providing Wi-Fi services. Bearer 1 may comprise a LTE stack, which may comprise a PDCP layer 102, a Wi-Fi Convergence Protocol (WCP) 110, a Radio Link Control (RLC) layer 104, a LTE MAC layer 106 and a LTE physical (PHY) layer 108. Bearer 2 may also comprise a LTE stack which may comprise a PDCP layer 112, a Wi-Fi Convergence Protocol 120, a RLC layer 114 and the LTE MAC layer 106 and the LTE physical (PHY) layer 108. In some embodiment, the LTE MAC layer 106 and the LTE physical (PHY) layer 108 may be shared by bearer 1 and bearer 2. The Wi-Fi stack may comprise a Wi-Fi MAC layer 116 and a Wi-Fi PHY layer 118. The PDCP layers 102 and 112 of the LTE stack may implement ciphering and header compression as in a conventional PDCP layer of the LTE stack, and in addition, a Wi-Fi aggregation function.

In the embodiment of FIG. 1, the LTE and Wi-Fi aggregation may be performed at the PDCP layer. In particular, the Wi-Fi aggregation function may perform traffic splitting between LTE and Wi-Fi. For example, the Wi-Fi aggregation function may rely on inputs from underlying radio conditions and Radio Resource Control (RRC) and other conditions, such as, but not limited to, buffer status, and Quality of Service (QoS) Class Identifier (QCI), to determine how to split data to be transmitted to a user device connected via both LTE and Wi-Fi. In addition, the Wi-Fi aggregation function may perform traffic aggregation of LTE and Wi-Fi to ensure in-order delivery. For example, the Wi-Fi aggregation function of the LTE stack of bearer 1 and bearer 2 may communicate with each other regarding underlying radio conditions and coordinate with each other to determine a best way to split the data between the LTE stack and Wi-Fi stack. Moreover, the Wi-Fi aggregation function of the LTE stack may generate sequence numbers to be assigned to data packets to ensure in-order delivery and/or assembly of data packets. In addition, the Wi-Fi Convergence Protocol (WCP) 110 and 120 may perform encapsulation and/or de-encapsulation PDCP packets in a format suitable for transmission over Wi-Fi. It should be noted that the aggregation protocol(s) (e.g., Wi-Fi Convergence Protocol 110 and 120) may interconnect the LTE side protocol and Wi-Fi side protocol entities in the data transmission path and they may add a layer of abstraction so that these LTE and Wi-Fi protocol entities do not need to be modified. For example, the aggregation protocols may implement functionalities for interconnection, such as, but not limited to, changing the PDUs from one format (e.g. LTE PDCP) to another (e.g. Wi-Fi MAC).

Figure 2:
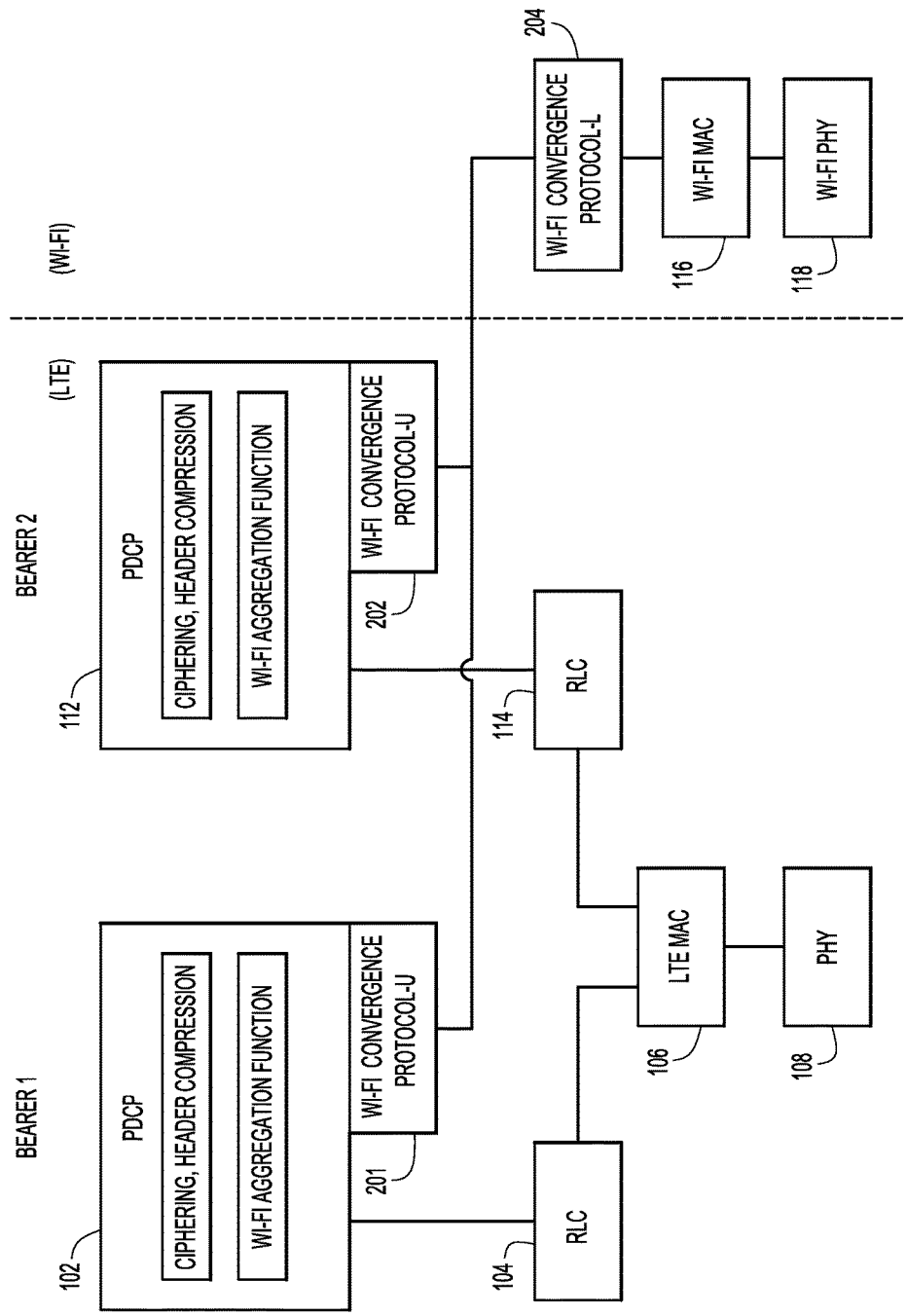
FIG. 2 is a block diagram illustrating LTE and Wi-Fi aggregation at the PDCP layer according to a second embodiment.

Referring now to FIG. 2, an alternative embodiment of the aggregation architecture of FIG. 1 is shown. In this alternative embodiment, the Wi-Fi Convergence Protocol 110 and Wi-Fi Convergence Protocol 120 in the LTE stack may be replaced by the Wi-Fi Convergence Protocol-U 201 and Wi-Fi Convergence Protocol-U 202 in the LTE stack, respectively. In addition, a Wi-Fi Convergence Protocol-L 204 may be added above the Wi-Fi MAC layer 116 in the Wi-Fi stack. Because the aggregation protocols may be used as a transport protocol between two protocol layers (a LTE layer and a MAC layer), in the embodiment shown in FIG. 2, the aggregation protocol may be split between an Upper part (e.g., Wi-Fi Convergence Protocol-U 201) and a Lower part (e.g., Wi-Fi Convergence Protocol-L 204) in order to provide maximum freedom for the protocol design. Thus, the functionality implemented by the Wi-Fi Convergence Protocol 110 and the Wi-Fi Convergence Protocol 120 may now be split between the Wi-Fi Convergence Protocol-U 201, the Wi-Fi Convergence Protocol-U 202 and the Wi-Fi Convergence Protocol-L 204. The Wi-Fi Convergence Protocol-U 201, the Wi-Fi Convergence Protocol-U 202 and the Wi-Fi Convergence Protocol-L 204 may act as an adaptation between the LTE PDCP layers 102 and 112 and the Wi-Fi MAC layer 116 so that the LTE PDCP layers 102 and 112 and the Wi-Fi MAC layer 116 may operate as they do in existing/legacy devices. For example, the Wi-Fi Convergence Protocol-U 201 and the Wi-Fi Convergence Protocol-U 202 may take input from the LTE side (e.g., a LTE side PDU), convert it in the transport protocol format and transport the converted data unit as a Service Data Unit (SDU) to the Wi-Fi side. The Wi-Fi Convergence Protocol-L 204 may take an input SDU delivered by the transport protocol from the LTE side and convert it into the Wi-Fi side SDU format.

Figure 3:
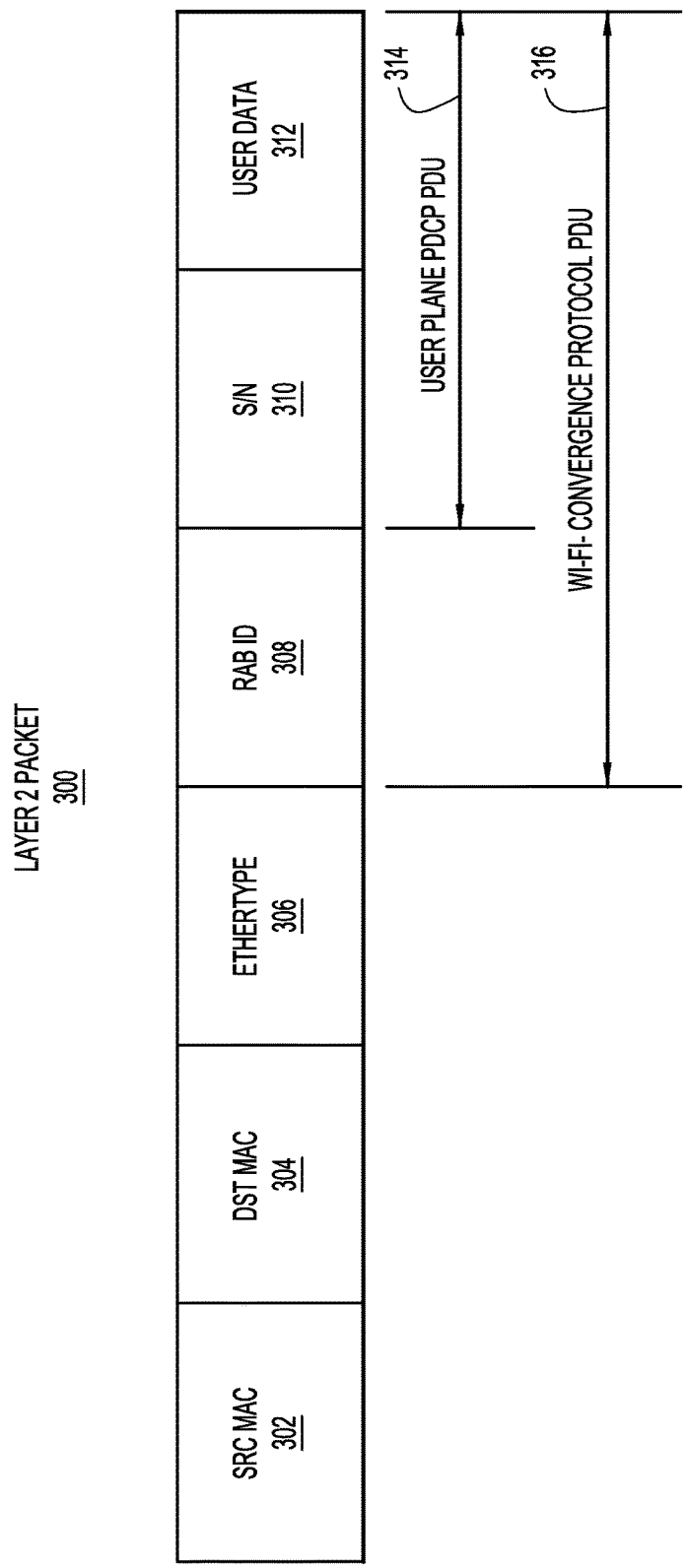
FIG. 3 is a diagram illustrating a Layer 2 packet to support PDCP layer aggregation according to an example embodiment.

With reference to FIG. 3, there is an illustration of an example Layer 2 packet 300 to support PDCP aggregation. As depicted in FIG. 3, the Layer 2 packet 300 may comprise a source MAC field 302, a destination MAC field 304, an EtherType field 306, a RAB ID field 308, a sequence number field 310 and a user data field 312. The source MAC field 302 and destination MAC field 304 may contain the source MAC address and destination MAC address of the packet 300. The EtherType field 306 may be, for example, a two-octet field that indicates which protocol is encapsulated in the payload of the Ethernet Frame. In one embodiment, a new EtherType value may be defined for PDCP-based LTE and Wi-Fi aggregation. The RAB ID field 608 may contain a RAB identifier (ID) that identifies the RAB for a packet 300. Thus, multiple Radio Access Bearers (RABs) may be multiplexed because each RAB may have a unique RAB ID for their respective Layer 2 packets. The sequence number field 310 may contain a sequence number for in-order delivery and/or assembly of packets and the user data field 312 may contain user data payload. Collectively, the sequence number field 310 and the user data field 312 may form a user plane PDCP Protocol Data Unit (PDU) 314; and the RAB ID field 308 and the user plane PDCP PDU 314 may form a WCP PDU 316.

In some embodiments, traffic for multiple User Equipments (UEs) may be multiplexed using the UE Wi-Fi MAC addresses. For example, for a packet transmitted by a UE, the Wi-Fi MAC address of the UE is in the source MAC field 302; and for a packet destined for a UE, the Wi-Fi MAC address of the UE is in the destination MAC field 304.

In various embodiments of PDCP layer aggregation, enhancements may be made to Radio Resource Control. For example, RRC may be modified to set up the secondary channel, such as to exchange UE and AP MAC addresses for the Wi-Fi Convergence Protocol, and to also exchange Service Set Identifier (SSID) and Basic SSID (BSSID) information. In some embodiments, Radio Resource Control may also be used to establish rules for determining what traffic to send on Wi-Fi versus LTE.

MAC Aggregation

Figure 4:
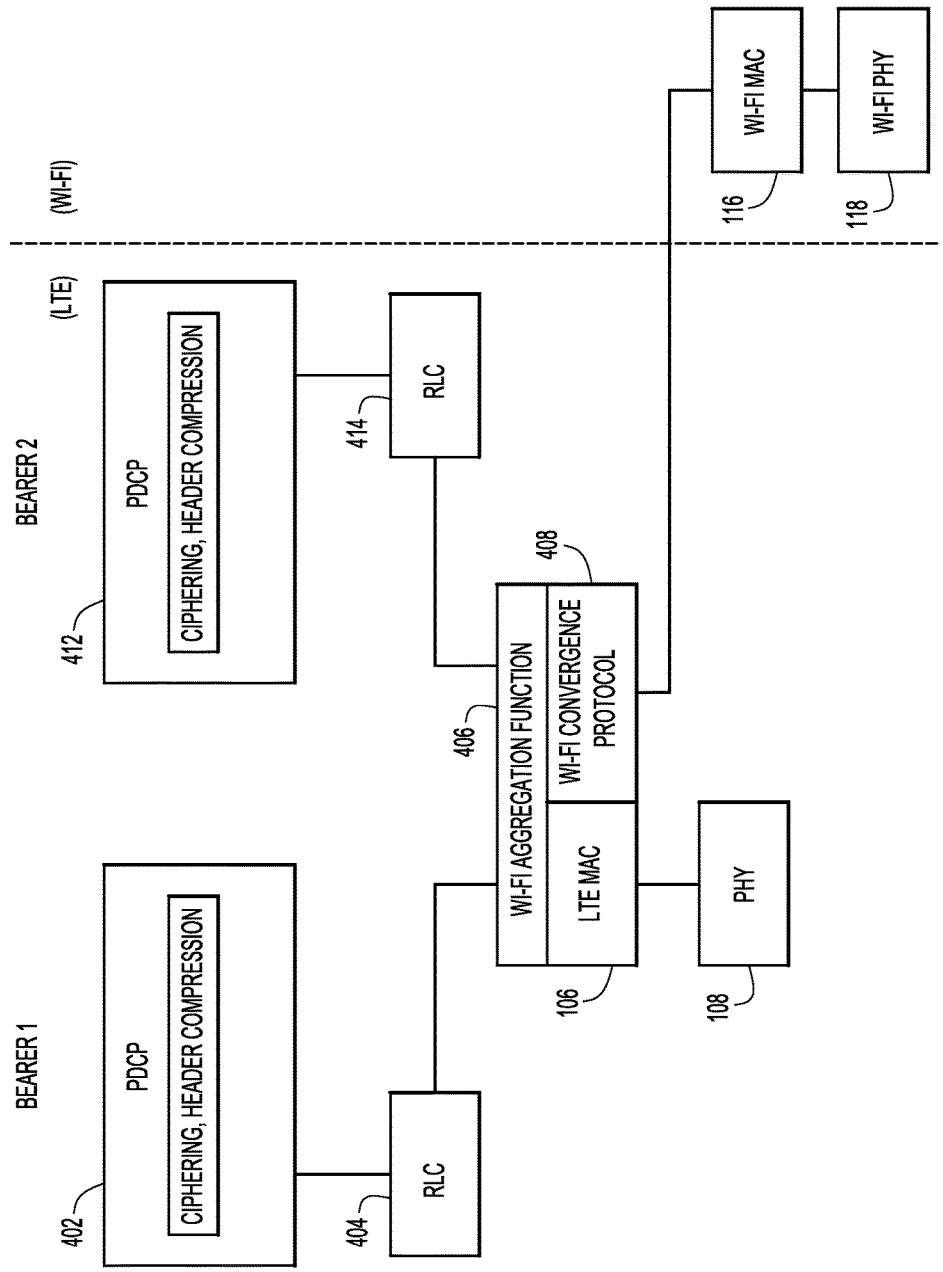
FIG. 4 is a block diagram illustrating LTE and Wi-Fi with Media Access Control (MAC) Aggregation, according to an example embodiment.

Reference is now made to FIG. 4, in which an example aggregation architecture of MAC Aggregation is shown with a bearer 1 and a bearer 2. Bearer 1 may have a LTE stack providing LTE services. Bearer 2 may have a LTE stack providing LTE services and a Wi-Fi stack providing Wi-Fi services. The LTE stack of bearer 1 may comprise a PDCP layer 402, a RLC layer 404, a Wi-Fi aggregation function 406, a Wi-Fi Convergence protocol 408, a LTE MAC layer 106 and a LTE PHY layer 108. The LTE stack of bearer 2 may comprise a PDCP layer 412, a RLC layer 414, the Wi-Fi aggregation function 406, the Wi-Fi Convergence Protocol 408, the LTE MAC layer 106 and the LTE PHY layer 108. In some embodiments, the Wi-Fi aggregation function 406, the Wi-Fi Convergence Protocol 408, the LTE MAC layer 106 and the LTE PHY layer 108 may be shared by the LTE stacks of bearer 1 and bearer 2. The Wi-Fi stack may comprise a Wi-Fi MAC layer 116 and a Wi-Fi PHY layer 118. In one embodiment, each of the PDCP layers 402 and 412 of the LTE stack may be a conventional PDCP layer of the LTE stack.

In the embodiment of FIG. 4, the LTE and Wi-Fi aggregation may be performed at the Wi-Fi Aggregation Function 406. In particular, the Wi-Fi Aggregation Function 406 may perform traffic splitting between LTE and Wi-Fi. For example, the Wi-Fi aggregation function may rely on inputs from underlying radio conditions and Radio Resource Control (RRC) and other conditions, such as, but not limited to, buffer status, and QCI, to determine how to split data to be transmitted to a user device connected via both LTE and Wi-Fi. In addition, the Wi-Fi aggregation function may perform traffic assembly of data packets received from the LTE and Wi-Fi to ensure in-order delivery. For example, the Wi-Fi MAC 116 may perform signaling with the Wi-Fi Aggregation Function 406 to provide UE related information about channel condition, buffer status, etc., using a signaling protocol. The Wi-Fi Aggregation Function 406 will use this information to determine how to schedule traffic across Wi-Fi and LTE. Moreover, the Wi-Fi Aggregation Function 406 may generate sequence numbers to be assigned to data packets to ensure in-order delivery and/or assembly of data packets. In addition, the Wi-Fi Convergence Protocol (WCP) 408 may perform encapsulation and/or de-encapsulation of LTE MAC packets in a format suitable for transmission over Wi-Fi.

Figure 5:
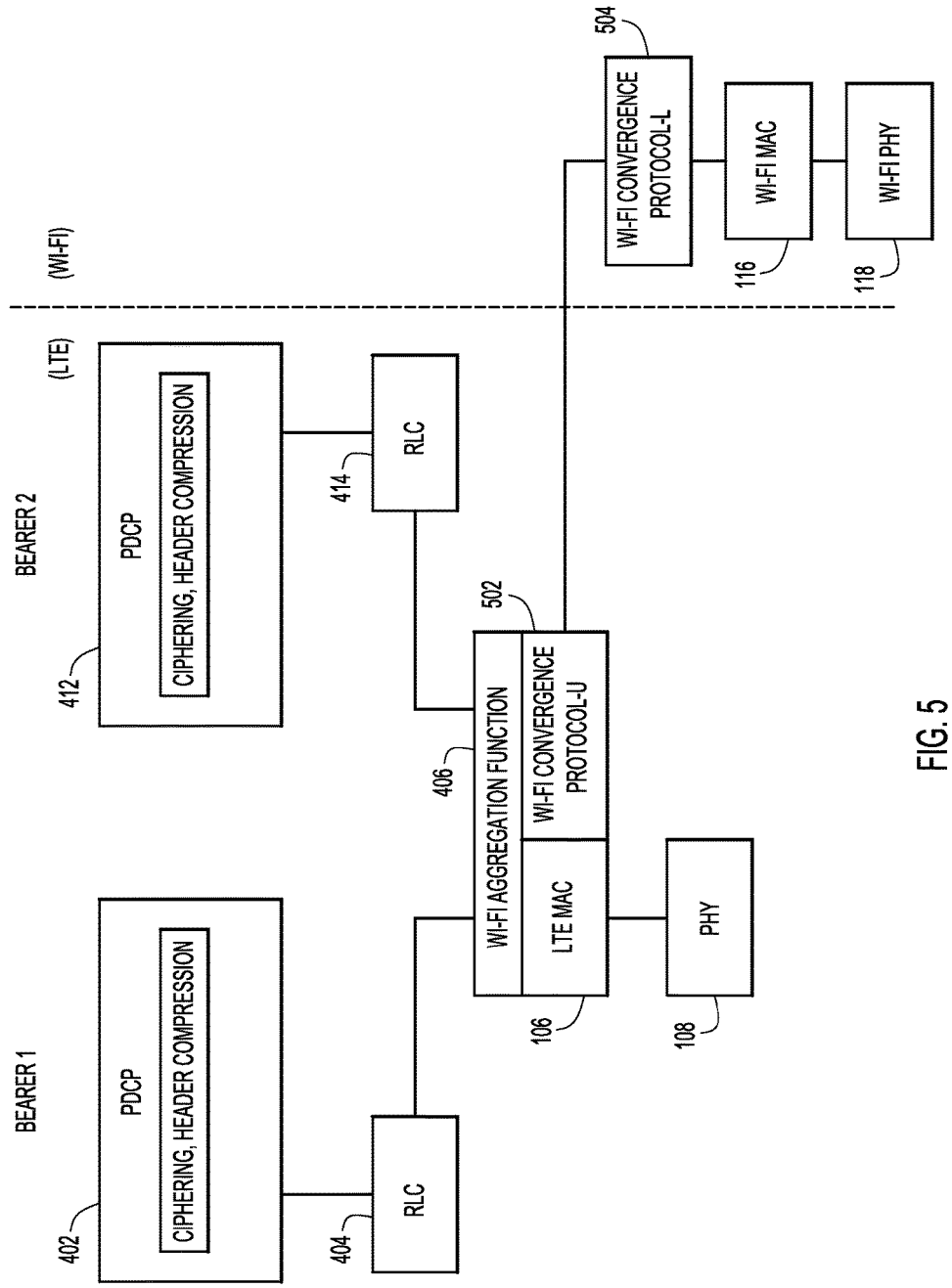
FIG. 5 is a block diagram illustrating LTE and Wi-Fi with Media Access Control (MAC) Aggregation, according to another example embodiment.

Referring now to FIG. 5, an alternative embodiment of the aggregation architecture of FIG. 4 is shown. In this alternative embodiment, the Wi-Fi Convergence Protocol 408 of FIG. 4 may be split into a Wi-Fi Convergence Protocol-U 502 in the LTE stack and a Wi-Fi Convergence Protocol-L 504 in the Wi-Fi stack. The Wi-Fi Convergence Protocol 408 may be similar to the Wi-Fi Convergence Protocol 110 and 120, the Wi-Fi Convergence Protocol-U 502 may be similar to the Wi-Fi Convergence Protocol-U 201 and 202, and the Wi-Fi Convergence Protocol-L 504 may be similar to the Wi-Fi Convergence Protocol-L 204, and thus, these aggregation protocols may implement the similar functionalities.

Figure 6:
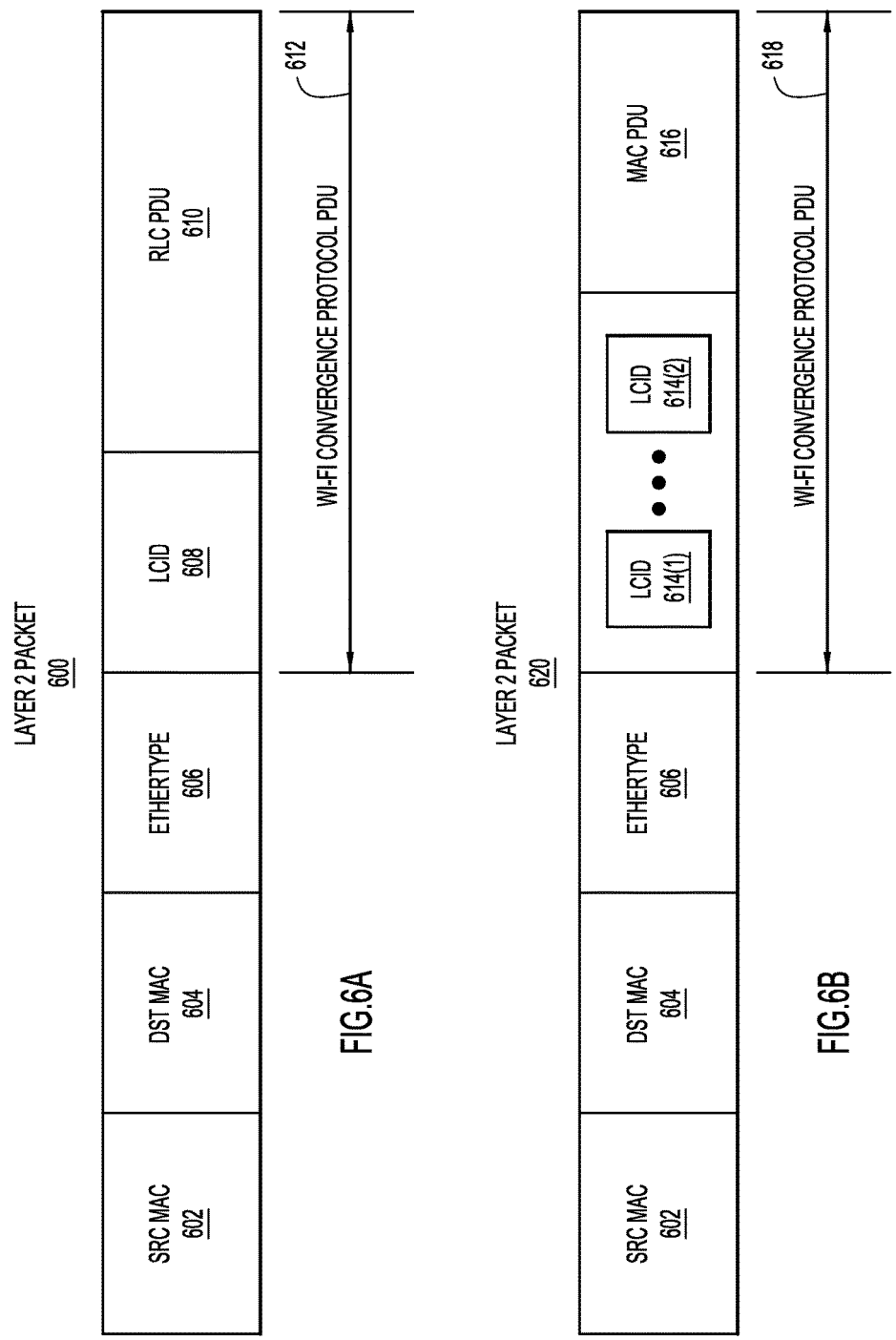
FIG. 6A is a diagram illustrating a Layer 2 packet to support MAC aggregation according to an example embodiment.
FIG. 6B is a diagram illustrating a Layer 2 packet to support MAC aggregation according to another example embodiment.

With reference to FIG. 6A, there is an illustration of an example Layer 2 packet 600 to support MAC aggregation. As depicted in FIG. 6, the Layer 2 packet 600 may comprise a source MAC field 602, a destination MAC field 604, an EtherType field 606, a Logical Channel Identifier (LCID) field 608 and a RLC Protocol Data Unit (PDU) 610. The source MAC field 602 and destination MAC field 604 may contain the source MAC address and destination MAC address of the packet 600. The EtherType field 606 may be, for example, a two-octet field that indicates which protocol is encapsulated in the payload of the Ethernet Frame. In one embodiment, a new EtherType value may be defined for MAC based LTE and Wi-Fi aggregation. The LCID field 608 may contain a LCID that enables a receiver MAC processor to multiplex different logical channels. The RLC PDU field 610 may contain the RLC PDU. Collectively, the LCID field 608 and the RLC PDU field 610 may form a Wi-Fi Convergence Protocol PDU 612. Similar to the PDCP aggregation, multiple channels to the same UE may be multiplexed using a UE Wi-Fi MAC address in the MAC aggregation.

Referring now to FIG. 6B, an alternative embodiment of the packet structure of FIG. 6A is shown. In this alternative embodiment, as depicted in FIG. 6B, the Layer 2 packet 620 may comprise the source MAC field 602, the destination MAC field 604 and the EtherType field 606 as the Layer 2 packet 600. Instead of a single LCID 608, the Layer 2 packet 620 may comprise a plurality of LCIDs 614(1) to 614(n), where n may be a positive integer greater than one. The Layer 2 packet 620 may also comprise a MAC PDU 616 and collectively, the plurality of LCIDs 614 and the MAC PDU field 616 may form a Wi-Fi Convergence Protocol PDU 618.

Figure 7:
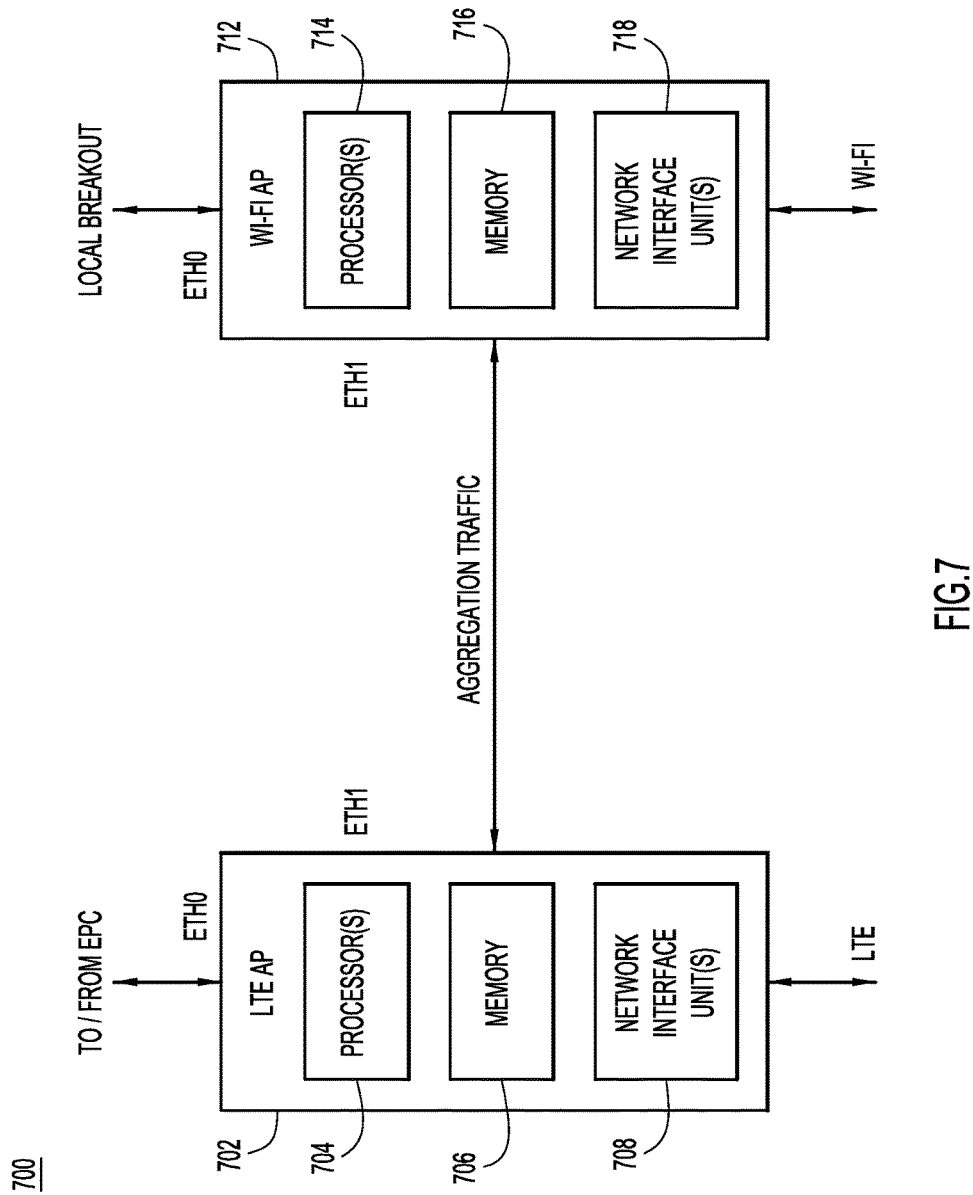
FIG. 7 is a block diagram illustrating a physical implementation of an integrated LTE plus Wi-Fi access point, according to an example embodiment.

Reference is now made to FIG. 7 for a description of an example implementation of an integrated LTE plus Wi-Fi AP system 700. The system 700 may comprise a LTE AP 702 and a Wi-Fi AP 704. The LTE AP 702 may comprise one or more processor(s) 704, a memory 706 and one or more network interface unit(s) 708. The Wi-Fi AP 712 may comprise one or more processor(s) 714, a memory 716 and one or more network interface unit(s) 718. The LTE AP 702 may be a LTE Femtocell (FAP) and configured with Wi-Fi AP details, including Basic Service Set Identifier (BSSID) and Service Set ID (SSID) of the Wi-Fi AP 712. Aggregation traffic flows between the internal Ethernet interface between the LTE AP 702 and Wi-Fi AP 712. In the system 700, Layer 2 of the network stack in either LTE stack, Wi-Fi stack, or both may be used to discover client connectivity. For example, Layer 2 discovery, Address Resolution Protocol (ARP), can be used for UE discovery. In one embodiment, Gratuitous ARP (GARP) may be initiated from either the LTE AP 702 or the Wi-Fi AP 712.

The memory 706 and 716 may each individually include read only memory (ROM), random access memory (RAM), magnetic disk storage media devices, optical storage media devices, flash memory devices, electrical, optical, or other physical/tangible memory storage devices. Thus, in general, the memory 706 and 716 may each individually comprise one or more tangible (non-transitory) computer readable storage media (e.g., a memory device) encoded with software comprising computer executable instructions and when the software is executed (by the processor 704 and 714 respectively) it is operable to perform the operations described herein, in connection with FIGS. 1-6 and 8-11, when executing the software stored in the memory 706 and/or 716. The processor 704 and 714 may each individually be a microprocessor or a microcomputer, for example. The network interface unit(s) 708 and 718 may each individually include one or more network interface cards that enable network communications. For example, the network interface unit(s) 708 of the LTE AP 702 may comprise one network interface Eth 0 for a connection to the evolved packet core (EPC), another network interface Eth 1 for a connection to the Wi-Fi AP 712, and one or more wireless network interface units for wireless communication with UEs; and the network interface unit(s) 718 of the Wi-Fi AP 712 may comprise one network interface Eth 0 for a connection to the local breakout (which backhauls Wi-Fi data back to a mobile core), another network interface Eth 1 for a connection to the LTE AP 702, and one or more wireless network interface units for communication with UEs.

It should be appreciated that in other embodiments, the LTE AP 702, Wi-Fi AP 712, or both, may include fewer or more components apart from those shown in FIG. 7. For example, part or whole network stack (e.g., LTE and/or Wi-Fi) including the aggregation logic may be in the form of firmware that is processed by Application Specific Integrated Circuits (ASICs), and may be integrated into a circuit board. Alternatively, part or whole network stack (e.g., LTE and/or Wi-Fi) including the aggregation logic may be in the form of one or more logic blocks included in a programmable logic device (e.g., a field-programmable gate array (FPGA)). Moreover, in one embodiment, the LTE AP 702 and Wi-Fi AP 712 may be combined in one computing apparatus such that one processor (or one set of processors) and one memory, or one set of ASIC or FPGA may be used to implement the part or whole network stack (e.g., LTE and/or Wi-Fi) including the aggregation logic. If LTE AP 702 and Wi-Fi AP 712 are combined in one computing apparatus, in one embodiment, aggregation traffic between them may be implemented using known techniques for inter-process communication in a computing system. The modifications or additions to the structures described in relation to FIG. 7 to implement these alternative or additional functionalities are appreciated by those skilled in the art, having the benefit of the present specification and teachings.

Figure 8:
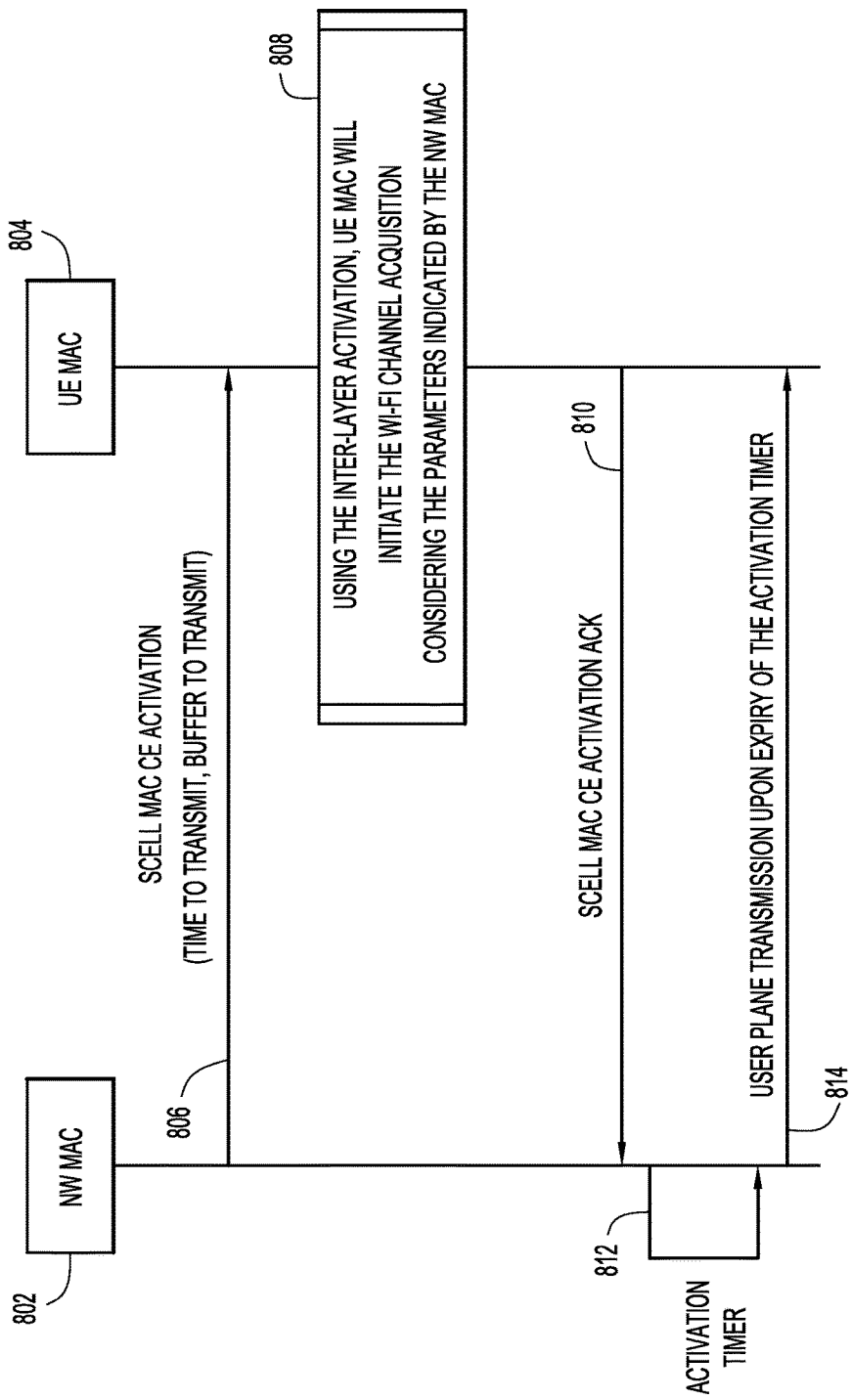
FIG. 8 is a sequence diagram illustrating signaling for Wi-Fi Component Carrier (CC) activation according to an example embodiment
Figure 9:
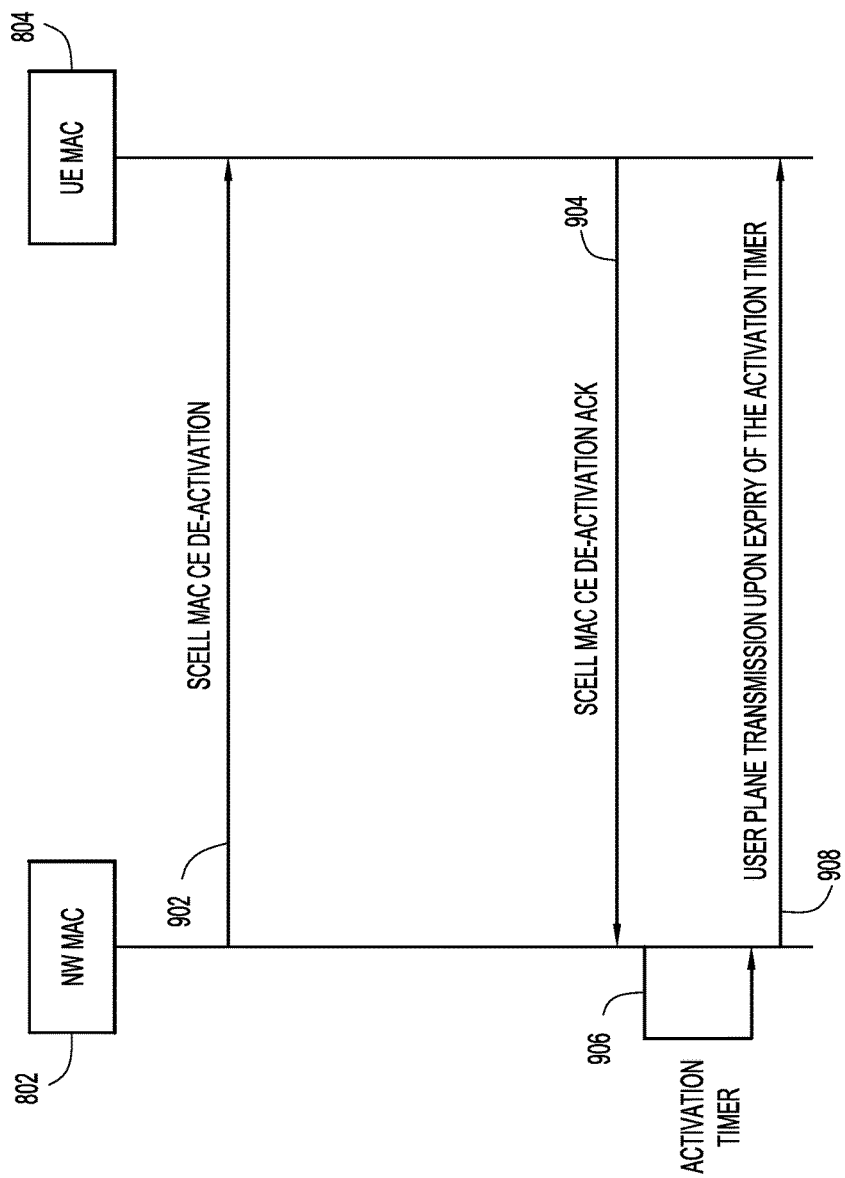
FIG. 9 is a sequence diagram illustrating signaling for Wi-Fi CC deactivation according to an example embodiment.

Reference is now made to FIGS. 8 and 9, which illustrate signaling for Wi-Fi Component Carrier (CC) activation and deactivation according to an embodiment. A Wi-Fi CC may act like a WLAN cell in addition to a LTE cell to which a UE is connected via a control plane. This cell (or component carrier) provides extra radio resources to the UE for user plane transmission and thus may be referred to as a secondary cell (Scell). The Network (NW) MAC 802 may be a component of the MAC layer (e.g., the Wi-Fi MAC 116) handling the Wi-Fi radio. It may be added on top of a legacy Wi-Fi MAC and may interact with the LTE MAC to handle the overall scheduling. The UE MAC 804 may be a counterpart component of NW MAC 802 at the UE MAC layer. The signaling flows of FIGS. 8 and 9 include the addition of a new MAC control element (CE) in both the uplink and downlink for Wi-Fi CC activation. The buffer status and transmit time information may be included in the MAC CE. An activation timer may be provided for Wi-Fi CC activation/deactivation.

As shown in FIG. 8, NW MAC 802 may initiate the Scell MAC CE Activation by a request at 806. The UE MAC 804 may initiate the Wi-Fi channel acquisition at block 808. The acquisition may use the parameters indicated by the NW MAC 802 in the Activation request. The UE MAC 804 may then send a Scell MAC CE Activation acknowledgement (ACK) at 810. NW MAC 802 may start a timer at 812 and start user plan transmission upon expiration of the timer at 814.

As shown in FIG. 9, NW MAC 802 may initiate the Scell MAC CE Deactivation by a request at 902. The UE MAC 804 may respond by sending a Scell MAC CE Deactivation ACK at 904. NW MAC 802 may start a timer at 906 and stop user plan transmission upon expiration of the timer at 908.

Figure 10:
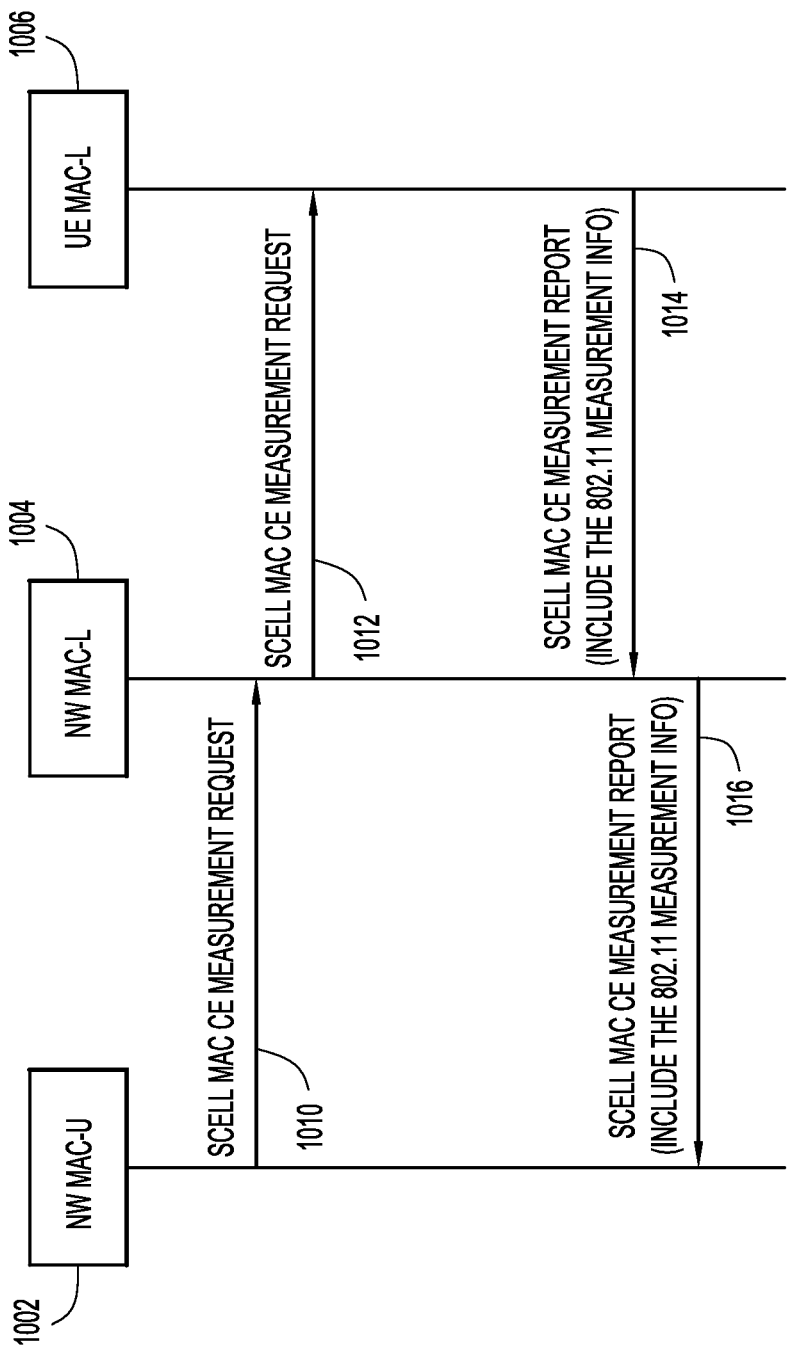
FIG. 10 is a sequence diagram illustrating signaling for measurement reporting according to an example embodiment.

Reference is now made to FIG. 10, which illustrates signaling for measurement reporting. As shown in FIG. 10, NW MAC-U 1002, which may correspond to the Wi-Fi Aggregation Protocol-U 502 may initiate the measurement reporting process by sending a Scell MAC CE Measurement Request at 1010 to a NW MAC-L 1004, which may correspond to the Wi-Fi Aggregation Protocol-L 504. The NW MAC-L 1004 may forward the Scell MAC CE Measurement Request to a UE MAC-L 1006, which may correspond to a UE MAC layer on a user device that corresponds to the network side Wi-Fi Aggregation Protocol-L 504. The UE MAC-L 1006 may respond by sending a Scell MAC CE Measurement Report at 1014. The Measurement Report may include measurements according IEEE 802.11 standards, such as but not limited to, buffer status, channel condition report, path loss, etc. The NW MAC-L 1004 may forward the Scell MAC CE Measurement Report to the NW MAC-U 1002 at 1016.

Figure 11:
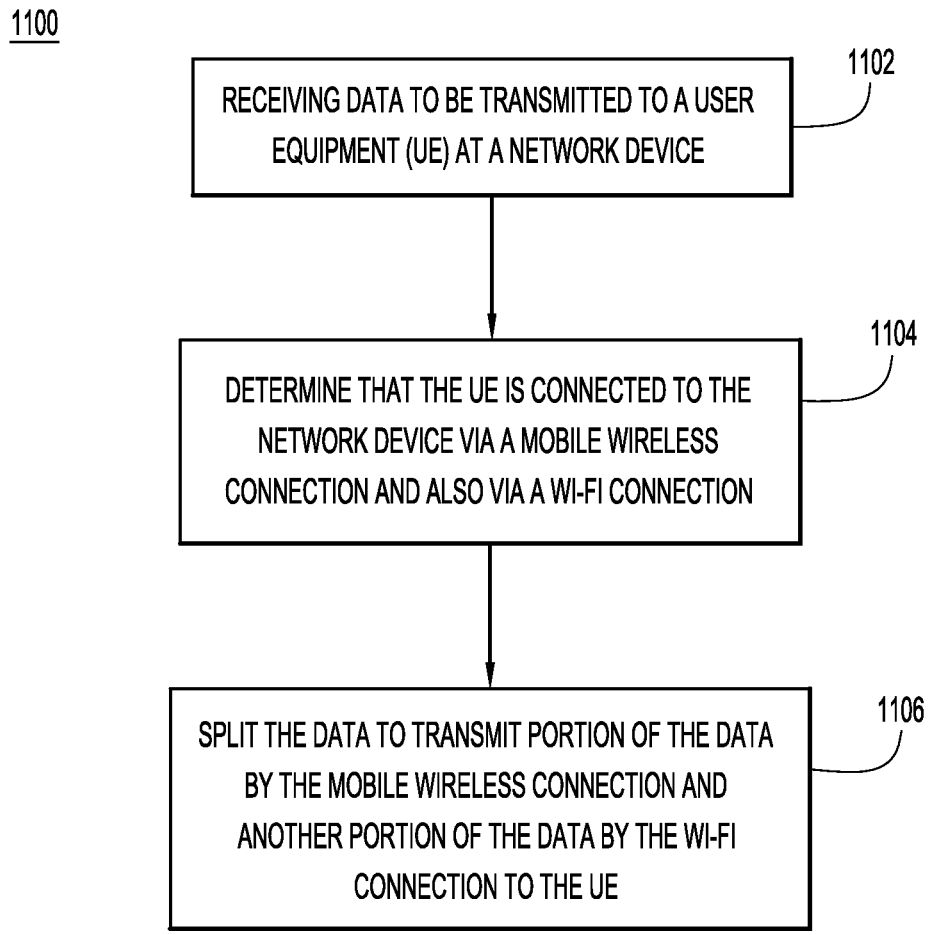
FIG. 11 is a flow chart illustrating, at a high level, operations performed for aggregating LTE and Wi-Fi traffic according to an example embodiment.

Reference is now made to FIG. 11 for a description of a high-level flow chart of a method 1100 according to the techniques presented herein. At 1102, data to be transmitted to a user device may be received at a network device. The user device may be a UE and the network device may be, for example, a LTE base station acting as a Master evolved NodeB (MeNB). At 1104, it may be determined that the user device has network connectivity to the network device via a wide area wireless network connection and that the user device also separately has connectivity to the network device via a local area wireless network connection to an access point. In one embodiment, the LTE base station may include both an LTE AP and an Wi-Fi AP. In another embodiment, the LTE base station may include an LTE AP and have a network connection to a Wi-Fi AP. At 1106, the data to be transmitted may be split such that portion of the data may be transmitted by the wire area wireless network connection and another portion of the data may be transmitted by the location area wireless network connection to the UE.

To summarize, methods are presented herein to aggregate Wi-Fi with LTE based on a modified PDCP layer or modified MAC layer. Some modifications are also presented herein for RRC. Channel aggregation is provided by means of a Wi-Fi Convergence Protocol implemented at the PDCP layer or MAC layer, and a Wi-Fi aggregation function that determines how to distribute traffic between Wi-Fi and LTE. Furthermore, a dual Ethernet interface AP is provided that simplifies physically implementation without significant modifications to either the Wi-Fi AP or LTE-AP hardware.

Wi-Fi-based channel aggregation has many advantages over LTE-U based channel aggregation. The concepts presented herein achieve co-existence with Wi-Fi, and enable neutral host solutions (on unlicensed channels) where required. No hardware changes are required. Given that LTE with Listen-Before-Talk (LBT) is yet to be defined, these solutions would be simpler and faster from a time to market perspective.

In summary, in one form, a method is provided comprising: receiving data to be transmitted to a user device at a network device; determining that the user device has network connectivity to the network device via a wide area wireless network connection and that the user device also separately has connectivity to the network device via a local area wireless network connection to an access point; and splitting the data so that some portion of the data is to be transmitted by the wide area wireless network connection and another portion of the data is to be transmitted by the local area wireless network connection.

In another form, an apparatus is provided comprising a network interface unit configured to enable communications over a network; a memory; a processor coupled to the network interface unit and the memory, wherein the processor is configured to: receive data to be transmitted to a user device; determine that the user device has network connectivity via a wide area wireless network connection and that the user device also separately has connectivity via a local area wireless network connection to an access point; and split the data so that some portion of the data is to be transmitted by the wide area wireless network connection and another portion of the data is to be transmitted by the local area wireless network connection.

In yet another form, one or more non-transitory computer readable storage media are provided encoded with instructions that, when executed by a processor, cause the processor to: receive data to be transmitted to a user device at a network device; determine that the user device has network connectivity to the network device via a wide area wireless network connection and that the user device also separately has connectivity to the network device via a local area wireless network connection to an access point; and split the data so that some portion of the data is to be transmitted by the wide area wireless network connection and another portion of the data is to be transmitted by the local area wireless network connection.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving data to be transmitted to a user device at a network device;
determining that the user device has network connectivity to the network device via a wide area wireless network connection and that the user device also separately has connectivity to the network device via a local area wireless network connection to an access point;
sending a measurement request to the user device to determine a condition of the local area wireless network connection;
receiving from the user device, a measurement report indicating the condition of the local area wireless network connection at the user device;
splitting the data at a Media Access Control (MAC) layer, so that a first portion of the data is to be transmitted by the wide area wireless network connection and a second portion of the data is to be transmitted by the local area wireless network connection, wherein splitting the data is based on the condition of the local area wireless network connection indicated in the measurement report;
transmitting the first portion of the data by the wide area network connection as one or more data packets;
initiating a timer to acquire a channel on the local area wireless network connection; and
upon expiry of the timer, transmitting the second portion of the data by the local area wireless network connection on the channel as one or more data packets, wherein each packet of the one or more data packets includes a plurality of Logical Channel Identifiers (LCIDs) that enable a receive MAC processor to multiplex a plurality of different logical channels.

2. The method of claim 1, wherein splitting the data is based on one or more conditions that include radio condition information, buffer status or Quality of Service (QoS) Class Identifier (QCI).

3. The method of claim 2, further comprising:
receiving uplink data from the user device from both the wide area wireless network connection and the local area wireless network connection; and
aggregating the uplink data to ensure in-order delivery of the uplink data.

4. The method of claim 3, wherein the aggregating is performed at the MAC layer.

5. The method of claim 4, wherein each of the one or more data packets comprises an Ethernet type identifying the packet as a Long Term Evolution (LTE) MAC Packet.

6. The method of claim 1, wherein the condition of the local area wireless network connection comprises at least one of a buffer status of the user device for the local area wireless network connection, a channel condition report for the local area wireless network connection, or an indication of path loss in the local area wireless network connection.

7. An apparatus comprising:
a network interface unit configured to enable communications over a network;
a memory;
a processor coupled to the network interface unit and the memory, wherein the processor is configured to:
receive data to be transmitted to a user device;
determine that the user device has network connectivity via a wide area wireless network connection and that the user device also separately has connectivity via a local area wireless network connection to an access point;
send a measurement request to the user device to determine a condition of the local area wireless network connection;
receive a measurement report indicating the condition of the local area wireless network connection at the user device;
split the data at a Media Access Control (MAC) layer, so that a first portion of the data is to be transmitted by the wide area wireless network connection and a second portion of the data is to be transmitted by the local area wireless network connection, wherein the processor is configured to split the data based on the condition of the local area wireless network connection indicated in the measurement report;
cause the first portion of the data to be transmitted by the wide area network connection as one or more data packets;
initiate a timer to acquire a channel on the local area wireless network connection; and
upon expiry of the timer, cause the second portion of the data to be transmitted by the local area wireless network connection on the channel as one or more data packets, wherein each packet of the one or more data packets includes a plurality of Logical Channel Identifiers (LCIDs) that enable a receive MAC processor to multiplex a plurality of different logical channels.

8. The apparatus of claim 7, wherein splitting the data is based on one or more conditions that include radio condition information, buffer status or Quality of Service (QoS) Class Identifier (QCI).

9. The apparatus of claim 8, wherein the processor is further configured to:
receive uplink data from the user device from both the wide area wireless network connection and the local area wireless network connection; and
aggregate the uplink data to ensure in-order delivery of the uplink data.

10. The apparatus of claim 9, wherein the processor is configured to perform the aggregate functions at the MAC layer.

11. The apparatus of claim 10, wherein the processor is further configured to cause each of the one or more data packets to be transmitted with an Ethernet type identifying the packet as a Long Term Evolution (LTE) MAC Packet.

12. The apparatus of claim 7, wherein the condition of the local area wireless network connection comprises at least one of a buffer status of the user device for the local area wireless network connection, a channel condition report for the local area wireless network connection, or an indication of path loss in the local area wireless network connection.

13. One or more non-transitory computer readable storage media encoded with instructions that, when executed by a processor, cause the processor to:

receive data to be transmitted to a user device at a network device;

determine that the user device has network connectivity to the network device via a wide area wireless network connection and that the user device also separately has connectivity to the network device via a local area wireless network connection to an access point;

send a measurement request to the user device to determine a condition of the local area wireless network connection;

receive a measurement report indicating the condition of the local area wireless network connection at the user device;

split the data at a Media Access Control (MAC) layer, so that a first portion of the data is to be transmitted by the wide area wireless network connection and a second portion of the data is to be transmitted by the local area wireless network connection, wherein the data is split based on the condition of the local area wireless network connection indicated in the measurement report;

cause the first portion of the data to be transmitted by the wide area network connection as one or more data packets;

initiate a timer to acquire a channel on the local area wireless network connection; and upon expiry of the timer, cause the second portion of the data to be transmitted by the local area wireless network connection on the channel as one or more data packets, wherein each packet of the one or more data packets includes a plurality of Logical Channel Identifiers (LCIDs) that enable a receive MAC processor to multiplex a plurality of different logical channels.

14. The non-transitory computer readable storage media of claim 13, wherein the instructions that cause processor to split are based on one or more conditions that include radio condition information, buffer status or Quality of Service (QoS) Class Identifier (QCI).

15. The non-transitory computer readable storage media of claim 14, wherein the instructions are further operable to cause the processor to:
  receive uplink data from the user device from both the wide area wireless network connection and the local area wireless network connection; and
  aggregate the uplink data to ensure in-order delivery of the uplink data.

16. The non-transitory computer readable storage media of claim 15, wherein the instructions cause the processor to perform the aggregate functions at the MAC layer.

17. The non-transitory computer readable storage media of claim 16, wherein the instructions cause the processor to cause each of the one or more data packets to be transmitted with an Ethernet type identifying the packet as a Long Term Evolution (LTE) MAC Packet.

18. The non-transitory computer readable storage media of claim 13, wherein the condition of the local area wireless network connection comprises at least one of a buffer status of the user device for the local area wireless network connection, a channel condition report for the local area wireless network connection, or an indication of path loss in the local area wireless network connection.

* * * * *